Sept. 3, 1963  R. A. BOZZOLA  3,102,382
TURBOCHARGER WASTE GATE SYSTEM
Filed Oct. 1, 1962

INVENTOR.
RICCARDO A. BOZZOLA
BY
Lockwood, Woodard, Smith & Weikart
Attorneys

United States Patent Office 3,102,382
Patented Sept. 3, 1963

3,102,382
TURBOCHARGER WASTE GATE SYSTEM
Riccardo A. Bozzola, Indianapolis, Ind., assignor to Schwitzer Corporation, Indianapolis, Ind., a corporation of Indiana
Filed Oct. 1, 1962, Ser. No. 227,465
7 Claims. (Cl. 60—13)

This invention relates generally to exhaust driven turbochargers for internal combustion engines and in particular to a system and apparatus for controlling the exhaust gas pressure delivered to the turbine side of a turbocharger and consequently the speed of the turbine rotor.

When a turbocharged internal combustion engine is started cold, there is an appreciable time interval between the start of the engine and the appearance of proper oil pressure at the locations (including particularly the turbocharger shaft bearings) requiring lubrication. Conventional bearing arrangements for turbocharges permit the turbocharger rotor to run safely in a condition of boundary lubrication for a reasonable length of time if the rotational speed of the rotor, and consequently of the turbocharger shaft, is kept low enough.

It is an object of the present invention to provide a system and apparatus which by-passes engine exhaust gases around the turbocharger turbine to hold its rotation at reduced speed until proper lubricating fluid pressure exists.

In internal combustion engines utilizing exhaust driven turbocharges it is highly desirable to provide a means for assuring that the maximum working pressure in the cylinders of the engine never reaches a dangerous level for the engine itself. If a means is provided for safeguarding against dangerous rise of the working pressure in the cylinders, a turbocharger can be matched to an engine so as to maintain higher boost pressures (turbocharger compressor outlet pressure or engine intake manifold pressure) at low engine speeds without adding to the boost pressures at high engine speeds and thereby impairing the mechanical strength of the engine at high speed.

It is a further object of the present invention to provide a waste gate control system and apparatus which functions to limit the speed of the turbocharger rotor by means of a waste gate valve until proper lubricating pressure is attained and which, through the same waste gate valve, prevents the boost pressure from exceeding a predetermined value independent of pressure in the lubricating system.

The foregoing objects have been achieved in a system disclosed in my copending application, Serial No. 176,-628, filed March 1, 1962, and entitled "Turbocharger Waste Gate System." In that system a pressure relief valve controls the maximum lubricating oil pressure and since it is well recognized that engine lubricating oil pressure varies considerably from engine to engine and with differing operating and environmental conditions, the relief valve must be adjusted to match each engine. The elimination of the relief valve adds practicability and reliability to the new system.

These and other objects will become apparent as the description proceeds with reference to the accompanying drawings in which.

Figure 1:
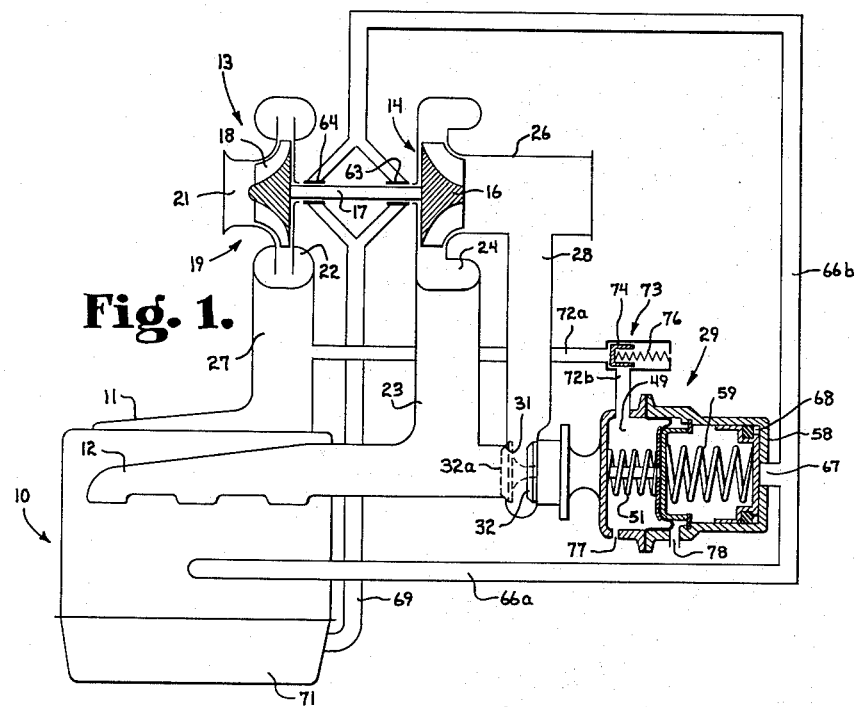
FIG. 1 is a schematic view showing the system and apparatus of the present invention incorporated with a turbocharged internal combustion engine.

Referring initially to FIG. 1 there is shown schematically at 10 an internal combustion engine having an intake manifold 11 and an exhaust manifold 12. The engine is charged by an exhaust driven turbocharger indicated generally at 13.

The turbocharger 13 itself is of conventional type and includes a turbine 14 having a rotor 16. A common turbocharger shaft 17 connects the rotor 16 with a compressor wheel 18 forming a component of a compressor indicated generally at 19.

The compressor 19 is provided with an inlet passage 21 and the air entering the inlet passage is compressed and discharged by the compressor wheel 18 into the compressor outlet passage or collector chamber 22. The driving force for the compressor is provided by the expansion of engine exhaust gases through the turbine 14. An exhaust passage 23 provides communication between the engine exhaust manifold 12 and the turbine inlet passage or collector chamber 24. The spent gases leaving the turbine rotor 16 are discharged to atmosphere through the discharge duct 26. As previously mentioned the turbine rotor drives the compressor wheel 18 and the compressed air produced at the compressor outlet chamber 22 is introduced into the engine intake manifold 11 by means of the inlet passage 27. A waste gate passage 28 communicates with the exhaust passage 23 and atmosphere through the discharge duct 26.

A waste gate valve, indicated generally at 29 controls communication between said exhaust passage 23 and the waste gate passage 28. The valve includes a seat 31 formed at the junction of the waste gate passage and the exhaust passage and a valve member in the form of a poppet valve disc 32 cooperating with the valve seat. The valve member 32 is carried on the end of a valve stem 33 and specific reference is now made to FIGS. 2 and 3 where the structure of the waste gate valve 29 is shown in detail.

The waste gate control valve 29 includes a cylindrical housing 34, the interior of which is provided with at least two principal bores, the first bore 36 being of greater diameter than the second bore 37. The housing end cover 38 may be secured to the housing flange 39 by means of bolts (not shown), a flexible diaphragm 41 providing a seal between the parts. The cover 38 also has a bore 42 therein which is coaxial with the bores 36 and 37 and serves as a guide for the valve stem 33. A flange 43 is provided adjacent the end of the cover 38 whereby the housing can be conveniently mounted to the waste gate passage 28 at the location indicated schematically in FIG. 1.

A fixed stop is provided in the housing and may take the form of a snap ring 44 seated in the groove 46. The stampings 47 and 48 are secured to the valve stem 33 and have sandwiched between them a portion of the diaphragm 41, which parts cooperate with the housing and valve stem to provide a movable wall creating a first chamber 49 which is isolated from the remainder of the interior of the housing. A first coil spring 51 is disposed in chamber 49 and, being compressed between the cover 38 and the plate 47 secured to the valve stem 33, biases the valve disc 32 away from the valve seat 31. The plate 48 being cup shaped engages the stop ring 44 to limit the motion of the first movable wall and therefore of the waste gate valve member caused by the spring 51.

A second movable wall is provided in the housing by means of the cup-shaped member 53 disposed in the bore 37 for movement along the axis thereof. The annular elastic member 54 which is retained in place on the member 53 by the retainer plate 56 secured to the member 53, provides a seal between the member 53 and the bore of the housing. Therefore it is seen that by the provision of the second movable wall, a second chamber 57 is provided in the housing between the first movable wall and the second movable wall, and a third chamber is provided in the housing between the second movable wall and the integral right-hand end cover 58 of the housing.

Figure 3:
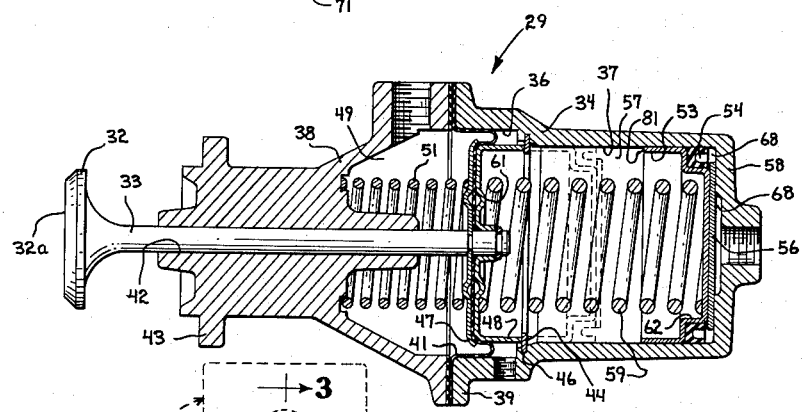
FIG. 3 is a side sectional view taken generally along the line 3—3 of FIG. 2.

A second coil spring 59 is disposed in the second chamber between the first and second movable walls. In the condition where the movable walls are located as shown in FIGS. 1 and 3, the spring 59 may be in the free length or unloaded condition, being retained coaxially with the bore 37 by means of the formed annular ridge 61 on the member 48 forming the first wall and by the cylindrical inner surface 62 of the member 53 forming the second movable wall.

Referring again to FIG. 1 specifically, an oil supply for the turbine bearings 63 and compressor bearings 64 is provided by a pressure line from the engine 10 and which line may be considered conveniently in two portions 66a and 66b. The oil supply line is tapped at the point 67 to supply oil to the third chamber 68 in the housing. The portion of the supply line from the tap point 67 to the turbocharger bearings is usually substantially shorter in length than the portion 66a of the line between the tap point and the engine itself. An oil return line 69 is connected from the bearings 63 and 64 to the engine oil sump 71.

A passage 72a—72b with a pressure sensing valve 73 therein, connects the inlet passage 27 to the first chamber 49 in the housing 34. The pressure sensing valve 73 includes a valve member 74 normally closing the passage 72 by reason of the bias thereon by the spring 76. Upon increase of pressure in the inlet 27 beyond a predetermined level, the valve 74 will open and admit air from the inlet 27 to the chamber 49. A metering orifice 77 is provided in chamber 49 to control the escape of air from the chamber 49.

Figure 2:
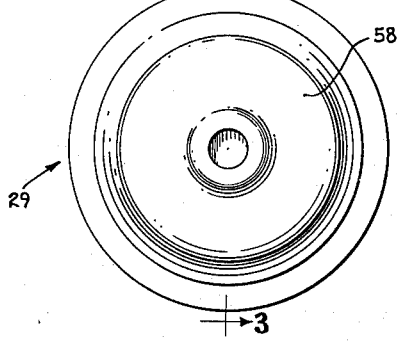
FIG. 2 is an end view of one of the components shown in FIG. 1.

From the foregoing, it can be seen that means are provided for applying air pressure in chamber 49 tending to move the first movable wall to the right for opening the waste gate valve member 32. Also it can be seen that means are provided whereby lubricating oil pressure from the engine can move the second movable wall to the left opposing the action of the spring 51 and any pressure in chamber 49 and thereby tending to close the waste gate valve. In order to avoid the build-up of pressure in the second chamber 57 intermediate the two movable walls, a vent opening 78 is provided in the housing and, being located at the bottom of the housing also serves as a drain to allow escape of any oil which might seep past the seal 54. It may be noted at this point that, if desired, the pressure sensing valve 73 may be mounted immediately adjacent the housing 34 as indicated in FIG. 2.

To understand the operation of the present invention, the engine 10 may be initially considered in non-operating condition. In this condition, there is no exhaust gas to drive the turbocharger and it is also therefore at rest. Accordingly, there is only atmospheric pressure in the chamber 49 as well as in the third chamber 68 and therefore the movable walls and the waste gate valve member are positioned as shown in FIGS. 1 and 3 of the drawing. As the engine is started, exhaust gas becomes immediately available to drive the turbocharger though there may be inadequate lubricating oil pressure at the turbocharger bearings to assure proper lubrication thereof. This is particularly true where the engine is very cold when started. The fact that the spring 51 is holding the waste gate valve member open permits a substantial portion of the exhaust gas to by-pass the turbine wheel and escape to atmosphere and thereby avoid driving the turbocharger at a speed which could cause damage to the bearings.

When the engine oil pressure rises to a value which is sufficient to insure that the pressure in line 66b is adequate to properly lubricate the turbocharger bearings, the pressure of the oil in line 66b and 66a at the junction 67 is adequate to move the second movable wall to the left whereby the force on the wall caused by the oil pressure is transmitted through the spring 59 to the first movable wall tending to close the waste gate valve. Assuming that the pressure in the inlet passage 27 has not risen to the point where the pressure sensing valve 73 will admit air to the first chamber 49, the force transmitted by the spring 59 is adequate to overcome the resistance of the spring 51 and close the waste gate valve, whereby all of the exhaust is forced to expand through the turbine wheel causing the turbocharger to accelerate and reach normal operating speed. Of course, when the waste gate valve is closed, the valve member 32 being seated on the valve seat 31, the exhaust gas pressure acts upon the upstream face 32a of the valve member in opposition of the force applied by the oil pressure through the spring 59.

To avoid excessive boost pressure in the inlet passage 27, the pressure sensing valve 73 will open at a predetermined pressure level in the line 72a and permit air from the passage 27 to enter the chamber 49. The metering orifice 77 is sized to allow a modulated pressure build-up in the chamber 49 when the sensing valve 73 is open, whereupon the combined effect of the exhaust gas pressure on the base 32a of the waste gate valve member, the spring 51, and the pressure in the chamber 49 is sufficient to overcome the force exerted by the spring 59 and move the first movable wall to the right. Accordingly, the valve member 32 is moved to the right permitting escape of exhaust gas directly to atmosphere whereupon the portion available to drive the turbine wheel is reduced. Thus the speed of the turbocharger is controlled and the boost pressure is prevented from reaching an excessive value.

The proportioning of the parts is such that the percentage of the exhaust gas by-passing the turbine wheel is sufficient to maintain the compressor outlet pressure at the desired level. This action assures that the boost pressure in the engine inlet manifold does not exceed a predetermined value, this value being such that the maximum working pressure in the cylinders of the engine never reaches a dangerous level. Thus a turbocharger with a waste gate control system as described herein can be matched to an engine in such a way that higher boost pressures are maintained at lower engine speeds without impairing the mechanical strength of the engine at high speeds. An improved torque characteristic for the engine is thus obtained over the normal range of engine speeds.

According to the present invention, the proper control of boost pressure by the use of the pressure sensing valve 73 can be obtained regardless of the lubricating oil pressure. It will be observed, that regardless of the engine oil pressure developed, the cup-shaped member 53 of the second movable wall can be moved no farther to the left than the position designated by the dotted outlines in FIG. 3 where the forward end 81 of the member 53 abuttingly engages the snap ring 44. Accordingly, the right-hand end of the spring can be moved no farther to the left by oil pressure than its limiting position defined by engagement of the member 53 against the stop 44, and the spring 59 cannot develop sufficient force to overcome the combined effect of the spring 51, of the exhaust pressure against the upstream face 32a of the valve member 32, and of the pressure in chamber 49 which will provide the proper maximum boost pressure. The oil pressure necessary to engage member 53 with the stop 44 is well below the normal, operating oil pressure developed so that the position of valve member 32 is independent of the oil pressure under normal engine operating conditions.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A turbocharger control system comprising: a turbocharger having a compressor wheel and a turbine wheel coupled together and having a compressor outlet; a source of gas; a first conduit conducting gas from said source to said turbine to drive said turbine; a port to atmosphere located in said conduit; a waste valve member operable to open and close said port for controlling the amount of gas conducted to said turbine; a waste valve controller including a housing, first and second movable walls in said housing providing two chambers therein, said first wall being connected to said waste valve member, and said controller further including first resilient means biasing said waste valve member to a port opening condition, and said controller including second resilient means biasing said walls apart; a source of fluid pressure connected to one of said chambers for moving said second wall toward said first wall to move said waste valve member to a port closing condition; and a passageway to conduct air from the said compressor outlet to the other of said chambers for cooperating with said first resilient means to move said waste valve to an open condition whereby excessive compressor outlet pressures are avoided.

2. A control system as set forth in claim 1 wherein a stop is secured to said housing to limit the extent of said movement of said second wall toward said first wall, whereby a predetermined pressure in said other chamber is enabled to move said valve member to a port opening condition independent of the level of fluid pressure in said one chamber.

3. A control system for a turbocharged internal combustion engine having intake and exhaust manifolds, said system including: a turbocharger having bearings and a compressor and a turbine for driving said compressor; means providing lubricating fluid under pressure for said bearings; said compressor and turbine each having an inlet and an outlet; an exhaust passage providing communication between said engine exhaust manifold and said turbine inlet whereby said turbine is driven by the exhaust gases; a first passage providing communication between said compressor outlet and said engine intake manifold to supply a boost pressure thereto; a waste gate passage joining said exhaust passage and communicating with atmosphere; a valve for controlling said waste gate passage and including a valve member movable for closing and opening said valve; first resilient means biasing said valve member open; a control housing having a first movable wall therein; means interconnecting said movable wall and said valve member whereby a pressure within said housing on one side of said first movable wall aids the force exerted by said first resilient means tending to open said valve and whereby force on the other side of said movable wall opposes said first resilient means tending to close said valve; a second movable wall in said control housing, said first and second walls providing first, second and third chambers in said housing; second resilient means disposed between said first and second movable walls and tending to increase the distance between said movable walls; and a fluid line introducing said lubricating fluid under pressure into the said third chamber of said housing whereby the force exerted by said lubricating fluid is applied through said second resilient means tending to close said valve.

4. A control system as set forth in claim 3 wherein a stop is connected to said housing to limit the extent of travel of said second movable wall caused by fluid pressure in said third chamber whereby a predetermined pressure in said first chamber is effective to open said valve regardless of the level of pressure of said fluid in said thir chamber.

5. A control system as set forth in claim 3 wherein a second passage connects said first passage to said first chamber to supply air from said compressor to said first chamber, thereby providing a force to hold said valve open and by-pass sufficient exhaust gas to limit the pressure generated at said compressor outlet.

6. The system of claim 5 wherein a pressure sensing valve is provided in said second passage, said pressure sensing valve including a valve member for opening and closing said sensing valve and a biasing spring normally holding said valve member in a valve closing position during conditions of compressor outlet pressure below a predetermined level, said valve member being movable to an open condition by pressure in said first passage above a predetermined value to accommodate flow of air to said first chamber from said compressor, and a metering orifice to atmosphere is provided in said first chamber to restrict the flow of air out of said first chamber.

7. A control system for a turbocharged internal combustion engine having intake and exhaust manifolds, said system including: a turbocharger having a compressor and a turbine for driving said compressor and having compressor and turbine bearings; means providing lubricating fluid under pressure for the compressor and turbine bearings, said compressor and turbine each having an inlet and an outlet; an exhaust passage providing communication between said engine exhaust manifold and said turbine inlet whereby said turbine is driven by the exhaust gases; a first passage providing communication between said compressor outlet and said engine intake manifold to supply a boost pressure thereto; a waste gate passage joining said exhaust passage and communicating with atmosphere; a valve for controlling said waste gate passage and including a seat disposed at the junction of said waste gate passage and said exhaust passage; a valve member rectilinearly movable toward and away from said valve seat thereby closing and opening said valve, the upstream face of said valve member being exposed to the pressure in said exhaust manifold passage when said valve is closed; first resilient means biasing said valve member away from said valve seat; a control housing having a first movable wall therein; means interconnecting said movable wall and said valve member whereby pressure within said housing on one side of said first movable wall aids the force exerted by said first resilient means tending to move said valve member away from said seat and whereby force on the other side of said movable wall opposes said first resilient means to urge said valve member toward said seat; a second movable wall in said control housing, said first and second walls providing first, second and third chambers in said housing; second resilient means disposed between said first and second movable walls and biasing said walls in a manner tending to increase the distance between said movable walls; a lubricating fluid line introducing lubricating fluid under pressure into said third chamber of said housing; a stop in said housing to limit the movement of said second wall by said fluid pressure in said third chamber whereby a force whose magnitude is independent of said fluid pressure is applied through said second resilient means to urge said valve member toward said seat; a second passage providing communication between said first passage and said first chamber for introducing to said first chamber a pressure which is a function of the compressor outlet pressure; a control valve normally closing said second passage and opening said second passage only upon existence of a predetermined compressor outlet pressure to apply a force on said first movable wall to open said waste gate valve to by-pass a portion of the exhaust gas and thereby produce an exhaust gas pressure in the turbine inlet passage which produces a compressor speed sufficient to maintain said predetermined compressor outlet pressure.

References Cited in the file of this patent

UNITED STATES PATENTS

| | | |
|---|---|---|
| 1,310,683 | Sherbondy | July 22, 1919 |
| 3,035,408 | Silver | May 22, 1962 |
| 3,043,092 | Addie et al. | July 10, 1962 |